United States Patent [19]
Kopp et al.

[11] Patent Number: 5,356,363
[45] Date of Patent: Oct. 18, 1994

[54] APPARATUS FOR MAKING FLAT PACKAGING BAGS FROM A FLEXIBLE SHEET OF SYNTHETIC MATERIAL

[75] Inventors: Georg Kopp, Uhwiesen; Willy Altermatt, Neuhausen am Rheinfall, both of Switzerland

[73] Assignee: SIG Schweizerische Industrie-Gesellschaft, Neuhausen am Rheinfall, Switzerland

[21] Appl. No.: 56,548

[22] Filed: May 5, 1993

[30] Foreign Application Priority Data

May 6, 1992 [CH] Switzerland .................. 1451/92-4

[51] Int. Cl.⁵ ............................................. B31B 23/64
[52] U.S. Cl. .................................. 493/197; 493/194
[58] Field of Search ......................... 493/193–197, 493/205, 209, 269, 288; 53/550, 551, 552, 554

[56] References Cited

U.S. PATENT DOCUMENTS

| | | | |
|---|---|---|---|
| 2,237,119 | 4/1941 | Smith | 53/552 |
| 2,246,043 | 6/1941 | Heinmets . | |
| 2,923,115 | 2/1960 | Frank | 493/195 |
| 4,079,662 | 3/1978 | Puccetti | 493/209 |
| 4,277,302 | 7/1981 | Reid . | |
| 4,552,613 | 11/1985 | Auer . | |
| 4,974,396 | 12/1990 | Gaukler | 493/197 |
| 4,986,054 | 1/1991 | McMahon | 53/552 |

FOREIGN PATENT DOCUMENTS

| | | |
|---|---|---|
| 1815029 | 7/1969 | Fed. Rep. of Germany . |
| 4020391 | 1/1992 | Fed. Rep. of Germany . |
| 1130714 | 2/1957 | France . |

*Primary Examiner*—Jack W. Lavinder
*Attorney, Agent, or Firm*—Spencer, Frank & Schneider

[57] ABSTRACT

An apparatus for making flat packaging bags from a flexible web of indeterminate length includes a machine frame; a sled mounted on the machine frame for travel parallel to the direction of web advance; a first drive for reciprocating the sled parallel to the direction of advance; a mandrel mounted on the sled; a tubular folding body fixedly mounted on the machine frame and coaxially surrounding the mandrel for bending the web about the mandrel to form a web hose; a first sealing shoe mounted on the sled; a second drive for pressing the first sealing shoe against an outer face of the mandrel for providing a longitudinal sealing seam on the web hose situated between the mandrel and the first sealing shoe; a second sealing shoe mounted on the machine frame for displacements perpendicularly to the direction of web advance; a third drive for actuating the second sealing shoe for providing a transverse sealing seam on the web hose; and a cutter for severing a length of web hose from the web.

9 Claims, 3 Drawing Sheets

APPARATUS FOR MAKING FLAT PACKAGING BAGS FROM A FLEXIBLE SHEET OF SYNTHETIC MATERIAL

CROSS REFERENCE TO RELATED APPLICATION

This application claims the priority of Swiss Application No. 1451/92-4 filed May 6, 1992, which is incorporated herein by reference.

BACKGROUND OF THE INVENTION

This invention relates to an apparatus for making flat packaging bags from a flexible, film-like sheet made of a synthetic material.

A prior art apparatus of the above-outlined type, as described, for example, in U.S. Pat. No. 4,552,613, has two vertically oriented mandrels which are mounted on the machine frame and on which a respective, separate sheet is shaped into a hose and is sealed along the longitudinal sheet edges by longitudinal sealing shoes. Two transverse sealing shoes are mounted on two separate carriages which are coupled to a reciprocating drive. During the transverse sealing the transverse sealing shoes pull a bag downwardly and, after filling, separate it from the sheet web of indeterminate length.

SUMMARY OF THE INVENTION

It is an object of the invention to provide an improved apparatus of the above-outlined type which operates safely with high frequency and is easy to service.

This object and others to become apparent as the specification progresses, are accomplished by the invention, according to which, briefly stated, the apparatus for making flat packaging bags from a flexible web of indeterminate length includes a machine frame; a sled mounted on the machine frame for travel parallel to the direction of web advance; a first drive for reciprocating the sled parallel to the direction of advance; a mandrel mounted on the sled; a tubular folding body fixedly mounted on the machine frame and coaxially surrounding the mandrel for bending the web about the mandrel to form a web hose; a first sealing shoe mounted on the sled; a second drive for pressing the first sealing shoe against an outer face of the mandrel for providing a longitudinal sealing seam on the web hose situated between the mandrel and the first sealing shoe; a second sealing shoe mounted on the machine frame for displacements perpendicularly to the direction of web advance; a third drive for actuating the second sealing shoe for providing a transverse sealing seam on the web hose; and a cutter for severing a length of web hose from the web.

DESCRIPTION OF THE PREFERRED EMBODIMENT

Figure 1:
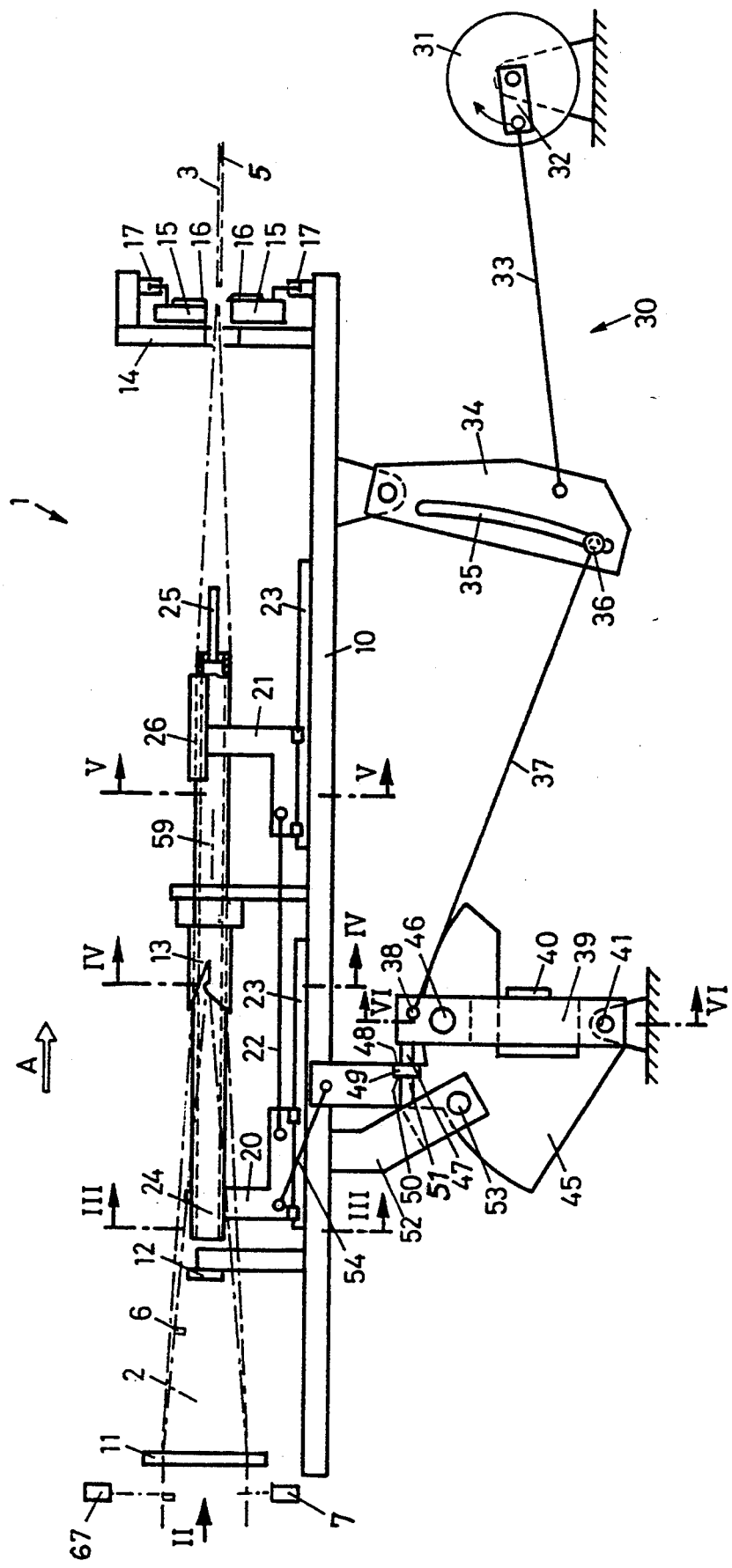
FIG. 1 is a schematic side elevational view of a preferred embodiment of the invention.

In the apparatus illustrated in the Figures, a plurality of flat bags 3 (three in the example) are simultaneously formed side by side from three synthetic webs 2. The finished bags 3 have a longitudinal, folded-down fin seal 4 and on one side they have a transverse seal 5. Subsequent to the bag forming in the illustrated apparatus, the bags are filled with material and are subsequently closed by a second transverse seal. Each web 2 has, along one of its edges, marks 6 which are spaced at a distance that corresponds to the length of the bag to be made. Each web 2 is associated with an optical barrier 7 which signals a control device when a trailing end of the sheet passes by (indicating that the web reel is empty).

On a machine frame 10 a plurality of deflecting rollers 11 are supported which are at an inclination between zero and 30° to the vertical and which are in contact with the webs 2 as they are pulled off from non-illustrated supply reels. Thus, the rotary axes of rollers 11 lie in the drawing plane of FIG. 2 and are inclined to the vertical by about 15°. The rollers 11 deflect the web 2 approximately 90°. When leaving the roller 11 the web 2 is a plain flat sheet; the disc 12 helps to form a tube from this flat sheet. Downstream of the rollers 11, as viewed in the direction of sheet advance A, circular guiding discs 12 are mounted which contact the webs. Each web 2 is shaped into a hose in separate, tubular bag folding bodies 13. At the downstream end of the apparatus, a support bracket 14 is mounted which holds two transverse sealing shoes 15 provided with knives 16. Essentially, the sealing shoes 15 are long bars each having a length dimension extending perpendicularly to the plane of FIG. 1. The sealing shoes 15 are shiftable by pneumatic cylinders 17 transversely to the feeding direction A to simultaneously seal all the side-by-side arranged bag hoses.

On the machine frame 10 there are mounted sleds 20 and 21 which are rigidly connected to one another by means of a connecting rod 22 and which are arranged behind one another and movable on rails 23 parallel to the web advancing direction A. A separate assembly 20-23 is provided for each web 2. The rear sled 20 carries a mandrel 24 which is a cross-sectionally circular cylindrical tube open at both ends. The mandrel 24 has a longitudinal axis 59 oriented parallel to the web advancing direction A. At the frontal (downstream) mandrel end a flat spreader 25 is mounted whose width is greater in the direction of the length of the sealing shoes 15 than the diameter of the mandrel 24. A sealing shoe 26 for providing a longitudinal sealing seam is secured to the front sled 21 for pivotal motion transversely to the feed direction A.

Figure 2:
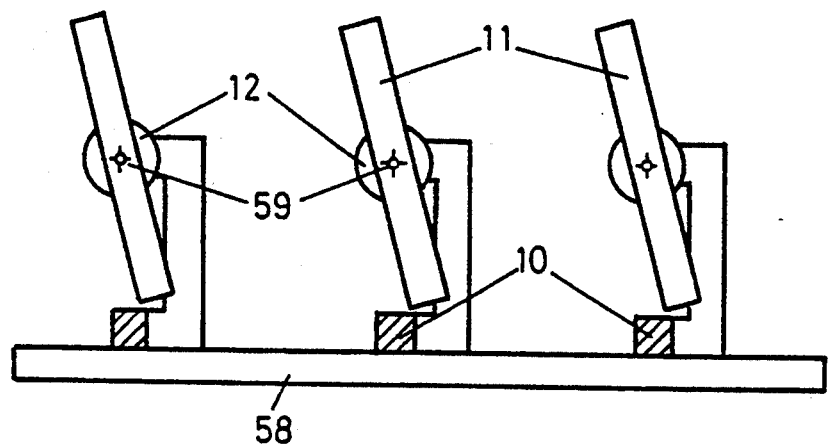
FIG. 2 is a schematic front elevational view in the direction of the arrow II of FIG. 1.

All the sleds 20, 21 have a common drive 30 which includes a motor 31 that drives a pivotal lever 34 with the intermediary of a crank 32 and an articulated rod 33. The lever 34 has a slot 35 of circularly arcuate configuration, in which an articulation 36 of a second jointed bar 37 is adjustably secured for changing its position according to the length of the bag. When the crank 32 is in its rear dead center position as shown in FIG. 1, the starting point of the radius of curvature (that is, the center of the curvature) of the slot 35 coincides with the joint 38 of the bar 37. The bar 37, by virtue of its attachment at 38, reciprocates a plurality of levers 39 which are pivotal about a common pivot shaft 41 and are rigidly connected to one another with a coupling bar 40.

Figure 6:
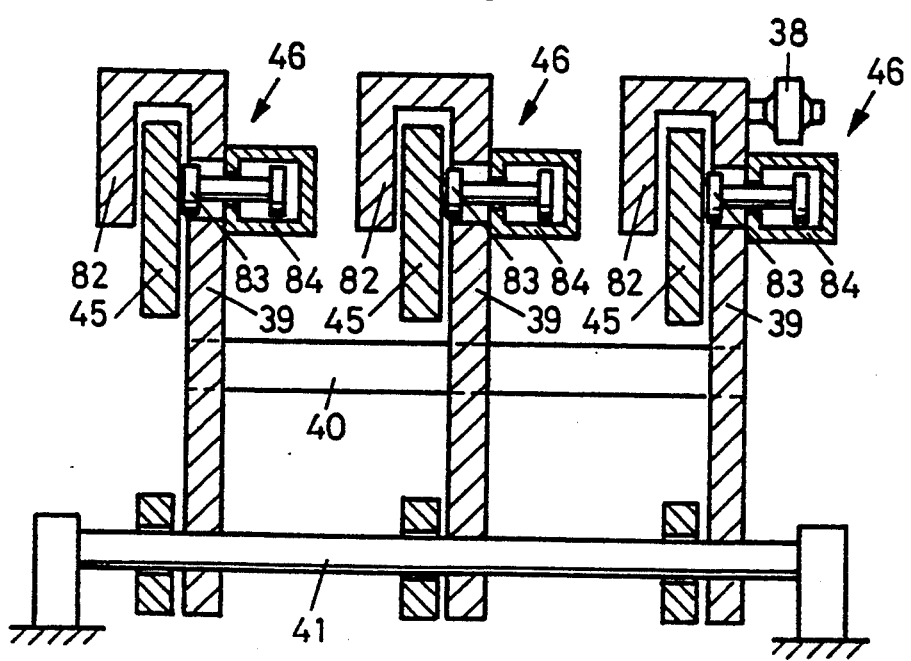
FIGS. 3, 4, 5 and 6 are sectional views taken along lines III—III, IV—IV, V—V and VI—VI respectively, of FIG. 1.

As shown in FIG. 6, for each web 2 there is provided a separate pivotal lever 45 mounted on the shaft 41. Each lever 39 carries a clamping device 46 by means of which it may be force-transmittingly coupled with the respective lever 45. Further, each lever 39 has an abutment 47 which, during normal operation, lies against an end face 48 of a bracket 49 affixed to the respective lever 45. In the rearward dead center illustrated in FIG. 1, the oppositely located end face 50 of the bracket 49 lies against a stop 51 stationarily supported by the machine frame or housing. The stop 51 is secured to an arm 52 which carries an additional clamping device 53 with which the respective lever 45 may be blocked in case the associated clamping device 46 is released. Each lever 45 is connected by means of a further jointed bar 54 with the associated sled 20.

Figure 3:
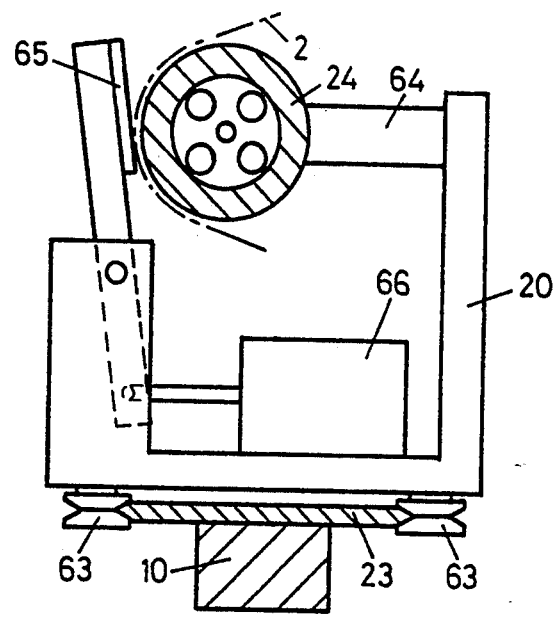

Turning to FIG. 3, the two sleds 20, 21 of each web track are each supported on the rails 23 by four rollers 63. The mandrel 24 of each web track is secured at its upstream end to the sled 20 by a horizontally projecting arm 64. Diametrically opposite this location of securement a clamping shoe 65 may be pressed by a pneumatic cylinder 66 against the mandrel 24 to carry the web 2 during the forward stroke (that is, a travel in the direction A) of the sleds 20, 21. On the machine frame 10 there is further mounted for each web track an additional reflecting light-type optical barrier 67 (FIG. 1) which responds to the markings 6 provided on the edges of the webs 2.

Figure 4:
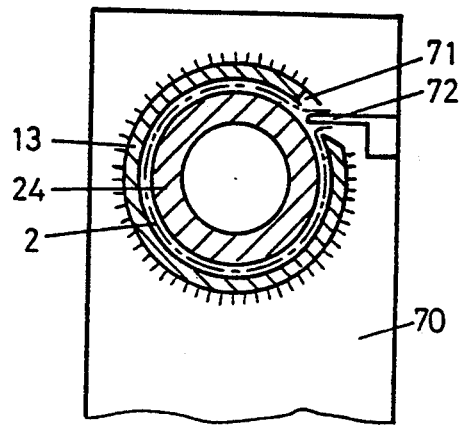

As shown in FIG. 4, a folding body 13 secured to the machine frame 10 between the two sleds 20, 21 surrounds each mandrel 24 with a clearance and has a forming slot 71 into which extends a tongue 72 for forming on the web 2 a folded-down longitudinal fin seal. The slot 71 and the tongue 72 are situated above the common horizontal plane which contains the mandrel axes 59, so that the completed longitudinal seal 4 may lie completely on one of the large faces of the flat bag 3, adjacent its edge. In this manner, both large faces of the bag may be provided with a printed message, without being interrupted by a seam.

Figure 5:
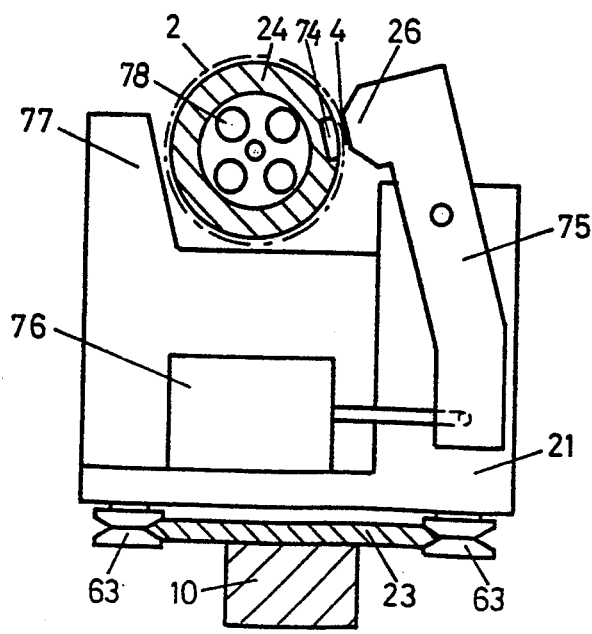

Turning to FIG. 5, at each sled 21 the longitudinal sealing shoe 26 is secured to a lever 75 which is pivotally supported for swinging motion about a pivot, whose axis extends parallel to the web feeding direction A. The mandrel 24 has at this location an adherence-repellent insert 74, for example, of PTFE, to prevent the inner web side from sticking to the mandrel 24 during the sealing of the folded longitudinal fin seal. The lever 75 is oscillated by a pneumatic cylinder 76. A countersupport 77 is secured to the sled 21 diametrically opposite the longitudinal sealing shoe 26. In the withdrawn (lifted) position of the sealing shoe 26 the countersupport 77 is slightly spaced from the mandrel 24 to allow a ready passage of the web 2. In FIG. 5 there are further shown bore holes 78 provided in the downstream end face of the mandrel 24. Through the bores 78 air is discharged during the reverse travel of the sleds 20, 21 in order to avoid a pumping effect.

Turning to FIG. 6, there is illustrated therein the clamping device 46 between the levers 39 and 45. Each lever 39 surrounds the associated lever 45 with a small clearance by means of a countersupport 82. Opposite the countersupport 82, each lever 39 carries a clamping shoe 83 which may be pressed against the lever 45 by a power cylinder 84. In this manner, the lever 39 is, during normal operation, clamped against the lever 45, so that the levers 39 and 45 move as a unit. The clamping devices 53 are of analogous construction.

In the description which follows, the operation of the above-described apparatus will be set forth.

In the forward dead center position of the crank 32 the two transverse sealing shoes 15, together with the knives 16 are moved towards one another by means of a control device (not shown). This produces the transverse sealing seam 5 while simultaneously the unilaterally open, previously made bag 3 is severed. During the transverse sealing step, the drive 30 propels the sleds 20, 21 with the released shoes 26, 65 into the rearward dead center position. After the sleds 20, 21 have passed the rear dead center position, the two shoes 26 and 65 in each web track are pressed against the respective mandrel 24 by means of the cylinders 66, 76. As the sleds 20, 21 travel in the direction A with shoes 26 and 65 engaging the web 2, the latter is pulled off its supply reel. The power cylinders 66 and 76 move the respective shoes 65 and 26 simultaneously into the web-engaging and withdrawn position. In case the sensor 67 emitted a signal because of the presence of a mark 6, the cylinders 66, 76 are actuated slightly later whereby a slightly shorter web is pulled off. In case the sensor 67 reports "no marking", the cylinders 66, 76 are actuated immediately upon passage of the dead center whereby a somewhat longer web is pulled off. Thus, the apparatus makes either a slightly shorter or a slightly longer bag than the distance between adjacent marks 6. When the sensor 67 has detected the mark 6 before the rear dead center is reached, the clamping takes place with a delay after passing the dead center and the apparatus now produces a first number (series) of shorter bags. After each step the mark 6 is then a little further upstream until it is no longer detected by the sensor 67 before the dead center. The apparatus now produces a second number or series of longer bags by initiating the grasping just after passing the dead center. After each step the mark 6 will now be a little further downstream until the mark 6 is again detected before passing the dead center. The apparatus automatically adjusts the proportion of the first and second number (series) such that on the average the mark 6 is just in the detection range of the sensor 67 before the sleds 20, 21 reach the rear dead center.

The web 2 is pulled over the deflecting roller 11 from the supply reel to an extent which corresponds to a bag length and simultaneously the longitudinal sealing seam 4 is provided. By the individual control of the sealing shoes 26, 65 in each web track there is obtained an accurate synchronization of the feeding strokes with the distances between the markings 6 on each web 2. In this manner, sheets which already carry a printed message may be processed to form bags 3 of appropriate length. Since immediately beyond the dead center the speed of the sleds 20, 21 is low, a grasping of the web 2 by means of the shoes 26, 65 during the forward stroke of the sleds 20, 21 is accurate and practically slip-free. By virtue of the dual grasping even very thin webs 2 may be processed. For setting to a different bag length the position of the articulation 36 is changed in the securing slot 35.

In case one of the webs comes to an end, the associated clamping device 46 is, upon a signal from the corresponding sensor 7, released and the clamping device 53 is actuated. The shoes 26, 65 belonging to this web track are automatically deactivated because the sleds 20, 21 are blocked. The webs associated with the other web tracks continue their travel normally, while at the interrupted web track the supply reel for the web 2 is replaced and its leading web end is secured (stapled) to the trailing end of the preceding web.

When the interrupted web track is again actuated, the clamping device 46 is energized and the clamping device 53 is released. The lever 39 thus again carries along the associated lever 45. Upon the successive return stroke the bracket 49 abuts the stop 51 and thereafter the clamping shoe 83 rides on the lever 45 until the rearward dead center shown in FIG. 1 is reached. Subsequently, all levers 45 again move synchronously. The clamping force of the clamping device 46, that is, the pressure in the cylinder 84 is so set that it is greater than necessary for the back-and-forth motion of the sleds 20, 21 but sufficiently small that the drive 30 is not blocked during the described adjusting displacement.

The apparatus described above is capable of manufacturing bags 3 at high frequencies. Because of the horizontal arrangement, the apparatus may be visually easily monitored and it is simple to service. The individual control of the web tracks makes possible an economical use despite the common drive. The steep position of the deflecting rollers 11 makes it possible to arrange several mandrels 24 closely next to one another so that the apparatus is compact despite the presence of a plurality of web tracks. The countersupport 77, upon pressing of the longitudinal sealing shoe 26 forms an additional, diametrically opposite clamping location so that the web 2 is being pulled with symmetrical forces. This results in an accurate web feed. As a result, the longitudinal sealing seam 4 may be narrow and thus packaging material may be saved.

It will be understood that the above description of the present invention is susceptible to various modifications, changes and adaptations, and the same are intended to be comprehended within the meaning and range of equivalents of the appended claims.

What is claimed is:

1. An apparatus for making flat packaging bags from a flexible web of indeterminate length passing through the apparatus in a direction of advance, comprising
    (a) a machine frame;
    (b) a sled mounted on said machine frame for travel parallel to said direction of advance;
    (c) a first drive means for reciprocating said sled parallel to said direction of advance;
    (d) a mandrel mounted on said sled; said mandrel having a longitudinal axis oriented parallel to said direction of advance;
    (e) a tubular folding body fixedly mounted on said machine frame and coaxially surrounding said mandrel for bending the web about said mandrel to form a web hose;
    (f) a first sealing shoe mounted on said sled;
    (g) a second drive means for pressing said first sealing shoe against an outer face of said mandrel for providing a longitudinal sealing seam on the web hose situated between the mandrel and said first sealing shoe;
    (h) a second sealing shoe mounted on said machine frame for displacements perpendicularly to said direction of advance;
    (i) a third drive means for actuating said second sealing shoe for providing a transverse sealing seam on the web hose; and
    (j) a cutting means for severing a length of web hose from the web.

2. The apparatus as defined in claim 1, wherein said mandrel comprises a tube having open opposite upstream and downstream ends as viewed in said direction of advance; said mandrel being affixed to said sled at said upstream end; further comprising a flat spreading element affixed to said downstream end of said mandrel; said second sealing shoe having a length dimension and said mandrel having a diameter; said spreading element has a width measured parallel to said length dimension; said width being greater than said diameter.

3. The apparatus as defined in claim 1, wherein said mandrel comprises a tube having open opposite upstream and downstream ends as viewed in said direction of advance; said mandrel being affixed to said sled at said upstream end; further wherein said first sealing shoe has an actuated position in which said first sealing shoe is pressed against said outer face of said mandrel at a location adjoining said downstream end of said mandrel; further wherein said first sealing shoe has an idle position in which said first sealing shoe is withdrawn from said outer face of said mandrel; further comprising a supporting element mounted on said sled diametrically opposite from said location; said supporting element being at a clearance from said mandrel in said idle position of said first sealing shoe.

4. The apparatus as defined in claim 1, wherein said mandrel comprises a tube having open opposite upstream and downstream ends as viewed in said direction of advance; said mandrel being affixed to said sled at said upstream end; further comprising a clamping shoe movably mounted on said sled, a fourth drive means mounted on said sled for urging said clamping shoe into a pressing contact against said mandrel to clamp the web thereagainst and control means for controlling said fourth drive means in synchronism with said second drive means.

5. The apparatus as defined in claim 1, wherein said sled and said tubular folding body are provided in a plurality; the sleds and the tubular folding bodies being mounted on said machine frame side by side to extend in series transverse to said direction of advance; a separate said mandrel, a separate said first sealing shoe and a separate said second drive means being mounted on each said sled; said second sealing shoe having a length dimension; the longitudinal axes of the mandrels lying in a common plane extending parallel to said length dimension of said second sealing shoe; further comprising means for separately coupling said first drive means to each said sled.

6. The apparatus as defined in claim 5, wherein said common plane has a substantially horizontal orientation.

7. The apparatus as defined in claim 5, wherein said first drive means comprises
    (a) a motor;
    (b) a crank driven by said motor;
    (c) a plurality of first levers supported for swinging motion about a common pivot axis oriented parallel to said common plane and perpendicularly to said direction of advance;
    (d) a connecting rod means for coupling said crank to said first levers;
    (e) a plurality of second levers supported for swinging motion about said common pivot axis; a separate said second lever being situated adjacent each said first lever and forming a lever pair therewith; each said second lever being connected to a separate said sled; and
    (f) a separate clamping device mounted on each lever pair; each clamping device including
        (1) a clamping member having a clamping position clamping the levers of the lever pair to one another to cause the levers of the lever pair to move as a unit and a released position allowing the levers of the lever pair to move independently from one another; and (2) a fourth drive means connected to said clamping member for moving the clamping member into one of the positions thereof.

8. The apparatus as defined in claim 7, further comprising a separate abutment mounted one each said second lever; a separate first stop mounted on said machine frame and a separate second stop mounted on each said first lever; each second lever having an end position; in said end position said abutment being in engagement with said first and second stops.

9. The apparatus as defined in claim 5, wherein said first sealing shoes are situated externally of said common plane; further comprising a separate deflecting roller mounted on said machine frame upstream of each said tubular folding body; each said deflecting roller having an axis of rotation inclined at an angle of 60° to 90° to said common plane.

* * * * *